US009205716B2

(12) United States Patent
Yoo et al.

(10) Patent No.: US 9,205,716 B2
(45) Date of Patent: Dec. 8, 2015

(54) ENERGY REGENERATION DEVICE OF SUSPENSION SYSTEM FOR VEHICLE

(71) Applicants: Sang Hoon Yoo, Chungcheongnam-do (KR); Sung Bae Jang, Gyeonggi-do (KR); Byung Gu Kang, Seoul (KR); Un Koo Lee, Seoul (KR)

(72) Inventors: Sang Hoon Yoo, Chungcheongnam-do (KR); Sung Bae Jang, Gyeonggi-do (KR); Byung Gu Kang, Seoul (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 51 days.

(21) Appl. No.: 14/096,479

(22) Filed: Dec. 4, 2013

(65) Prior Publication Data
US 2014/0182955 A1 Jul. 3, 2014

(30) Foreign Application Priority Data
Dec. 31, 2012 (KR) ........................ 10-2012-0158601

(51) Int. Cl.
*B60L 11/00* (2006.01)
*B60G 7/02* (2006.01)
*B60G 7/00* (2006.01)

(52) U.S. Cl.
CPC *B60G 7/02* (2013.01); *B60G 7/006* (2013.01); *B60G 2204/143* (2013.01); *B60G 2204/41* (2013.01); *B60G 2204/4191* (2013.01); *B60G 2300/50* (2013.01); *B60G 2300/60* (2013.01); *B60L 11/00* (2013.01); *B60L 11/002* (2013.01)

(58) Field of Classification Search
None
See application file for complete search history.

(56) References Cited

U.S. PATENT DOCUMENTS

| 1,752,844 | A | * | 4/1930 | Harrison | 310/93 |
| 3,559,027 | A | * | 1/1971 | Arsem | 322/3 |
| 3,981,204 | A | * | 9/1976 | Starbard | 74/34 |
| 4,032,829 | A | * | 6/1977 | Schenavar | 322/3 |
| 4,387,781 | A | * | 6/1983 | Ezell et al. | 180/65.22 |

(Continued)

FOREIGN PATENT DOCUMENTS

| JP | 2001-055033 A | 2/2001 |
| KR | 10-0978298 B1 | 8/2010 |
| KR | 2010-0093803 A | 8/2010 |

*Primary Examiner* — John Walters
*Assistant Examiner* — Hilary L Johns
(74) *Attorney, Agent, or Firm* — Mintz Levin Cohn Ferris Glovsky and Popeo, P.C.; Peter F. Corless

(57) ABSTRACT

An energy regeneration device of a suspension system for a vehicle is provided and includes a suspension link connecting a wheel carrier to a vehicle body and a bush unit disposed between a vehicle body connection portion of the suspension link and the vehicle body, outputs hinge motion of the suspension link via an output gear. A rotation fixing mechanism rotates the output gear by connecting the output gear to a side of the suspension link. A one-way power transmission mechanism connected with the output gear receives the hinge motion via an input gear and outputs one-way rotational power. A generator generates electricity while being rotated by the transmitted one-way rotational power. A speed-up mechanism disposed between the generator and the one-way power transmission mechanism transmits the one-way rotational power to the generator. A rectifier electrically connected with the generator, rectifies the electricity generated by the generator.

15 Claims, 6 Drawing Sheets

(56) References Cited

U.S. PATENT DOCUMENTS

| | | | |
|---|---|---|---|
| 4,825,656 A * | 5/1989 | Gardner Jr. | 60/668 |
| 5,036,934 A * | 8/1991 | Nishina et al. | 180/165 |
| 8,336,659 B2 * | 12/2012 | Pintos Pintos | 180/165 |
| 2007/0089924 A1 * | 4/2007 | de la Torre et al. | 180/305 |
| 2010/0006362 A1 * | 1/2010 | Armstrong | 180/165 |
| 2011/0001322 A1 * | 1/2011 | Armani et al. | 290/1 R |
| 2012/0000722 A1 * | 1/2012 | Pintos Pintos | 180/165 |
| 2012/0303193 A1 * | 11/2012 | Gresser | 701/22 |

\* cited by examiner

ENERGY REGENERATION DEVICE OF SUSPENSION SYSTEM FOR VEHICLE

CROSS-REFERENCE TO RELATED APPLICATION

This application claims priority to and the benefit of Korean Patent Application No. 10-2012-0158601 filed in the Korean Intellectual Property Office on Dec. 31, 2012, the entire contents of which are incorporated herein by reference.

BACKGROUND (a) Field of the Invention

The present invention relates to an energy regeneration device of a suspension system for a vehicle. More particularly, the present invention relates to an energy regeneration device of a suspension system for a vehicle which is mounted at a vehicle body connection portion of a suspension link and regenerates rotational kinetic energy generated from wheels into electric energy.

(b) Description of the Related Art

In general, the suspension system of a vehicle is a device that is disposed between the vehicle body and the wheels and connecting the two rigid bodies, using one or a plurality of links. The suspension system mechanically controls the relative motion between the vehicle body and the wheels by carrying vertical motion load with a chassis spring and a shock absorber and controlling high rigidity and flexibility in the other directions.

The suspension system provides improved riding comfort to passengers by effectively blocking irregular input from roads which is generated during vehicle travel and provides convenience for driving by controlling shaking of a vehicle which is generated by uneven roads. Further, when a vehicle travels on an uneven road, vehicle safety must be maintained when turning and braking by maintaining the vertical load on the surfaces of tires which are in contact with the ground at an appropriate level.

Various kinds of suspension systems have been developed and are used for vehicles to satisfy those conditions, and according to an example of the configuration of a common suspension system, as shown in FIG. 1, a wheel carrier 4 supports a wheel 2 to cause the wheel 2 to rotate is provided. The upper portion of the wheel carrier 4 is connected to a vehicle body 10 (e.g., vehicle subframe) by a front upper arm 6 and a rear upper arm 8 disposed in the transverse direction of the vehicle and the lower portion is connected to the vehicle body 10 by a lower arm 12 and an assist arm 14 which are disposed in the transverse direction of the vehicle and a trailing arm 16 disposed in the longitudinal direction of the vehicle.

Further, the upper portion of the wheel carrier 4 is connected with the vehicle body by a shock absorber 18 and a spring 20, an elastic member, is disposed between the lower arm 12 and the vehicle body, to attenuate the shock applied from a road surface and reduce free vibration to improve riding comfort. Additionally, the end of a stabilizer bar 22 that is fixed to the vehicle body is connected with the lower arm 12 by a connection link 24, to prevent the vehicle body from rolling.

According to the configuration, the suspension system of the related art can attenuate the shock from a road surface, reduce free vibration, and prevent the vehicle body from rolling; however, the kinetic energy, which is generated by the suspension links 6, 8, 12, 14, and 16 which continuously repeat bumping and rebounding based on the traveling conditions of the vehicle, is not recovered.

The above information disclosed in this section is only for enhancement of understanding of the background of the invention and therefore it may contain information that does not form the prior art that is already known in this country to a person of ordinary skill in the art.

SUMMARY

The present invention provides an energy regeneration device of a suspension system for a vehicle having advantages or being able to increase energy efficiency by regenerating kinetic energy from bumping and rebounding of a wheel, based on traveling condition, into electric energy.

Further, the present invention provides an energy regeneration device of a suspension system for a vehicle which absorbs unnecessary torsional force and increases transmission efficiency of rotational power by fixing an output gear of a bush unit, which is disposed at a vehicle body connection portion of a suspension link, in a rotation direction with respect to the suspension link.

An exemplary embodiment of the present invention provides an energy regeneration device of a suspension for a vehicle, which may include: a suspension link that connects a wheel carrier to a vehicle body; a bush unit that is disposed between a vehicle body connection portion of the suspension link and the vehicle body and outputs hinge motion of the suspension link via an output gear; a rotation fixing mechanism that rotates the output gear integrally with the vehicle body connection portion of the suspension link by connecting the output gear to a side of the suspension link and provides the degree of freedom with respect to torsion of the suspension link; a one-way power transmission mechanism that is connected with the output gear of the bush unit, receives the hinge motion transmitted from the output gear via an input gear, and outputs only one-way rotational power; a generator that is disposed at a side of the vehicle body and generates electricity while being rotated by the transmitted one-way rotational power; a speed-up mechanism that is disposed between the generator and the one-way power transmission mechanism and transmits the one-way rotational power transmitted from the one-way power transmission mechanism to the generator; and a rectifier that is electrically connected with the generator and rectifies the electricity generated by the generator.

The bush unit may include: an outer pipe combined with the vehicle body connection portion of the suspension link; an inner pipe disposed inside the outer pipe and fixed to a side of the vehicle body; a bush rubber disposed between the outer pipe and the inner pipe and combined with the outer pipe; an output gear connected with the bush rubber via an inner extension that extends between the rubber bush and the inner pipe; a bearing support ring fixed to the inner side of the inner extension of the output gear; and a first bearing disposed on the outer side of the inner pipe in friction contact with the bearing support ring.

A coupling portion may be formed at the inner extension of the output gear, and the rotation fixing mechanism may include: a fixing pin that protrudes from a side of the suspension link; and a connection link having a circular socket ring integrally formed at a side to be coupled to the coupling portion, and a slot at the other side. The coupling portion may have straight portions rotating integrally with the socket ring, and the socket ring may have support ends that support the straight portions.

The one-way power transmission mechanism may include: an inner case; an outer case combined with the inner case and having a bolt insertion pipe into which a bolt is inserted; an input gear engaged with the output gear inside the inner case and the outer case and having an outer extension that extends axially outward; a one-way clutch disposed on the outer side of the external extension; a speed-up gear disposed on the outer side of the one-way clutch; and one or more idle gears that transmit one-way rotational power to the speed-up mechanism in mesh with the speed-up gear. The one-way power transmission mechanism may further include: a third bearing disposed between the outer side of the input gear and the inner case; and a fourth bearing disposed between the inner side of the outer extension and the outer side of the bolt insertion pipe.

The speed-up mechanism may include: a speed-up mechanism housing integrally formed between the generator and the one-way power transmission mechanism; and one or more planetary gear sets disposed within the speed-up mechanism housing. The one or more planetary gear sets may be single pinion planetary gear sets. In addition, the one or more planetary gear sets may be three single pinion planetary gear sets. The three planetary gear sets may be connected to fix a ringer of each of the single pinion gear sets to the speed-up mechanism housing and may function as a fixed element, a planetary carrier may function as an input element, and a sun gear may function as an output element.

The three planetary gear sets may be composed of: a first planetary gear set that is a single pinion planetary gear set including a first sun gear, a first ring gear, and a first planetary carrier that supports a first pinion being in mesh with the first sun gear and the first ring gear therebetween; a second planetary gear set that is a single pinion planetary gear set including a second sun gear, a second ring gear, and a second planetary carrier that supports second pinion being in mesh with the second sun gear and the second ring gear therebetween; and a third planetary gear set that is a single pinion planetary gear set including a third sun gear, a third ring gear, and a third planetary carrier that supports a third pinion disposed between the third sun gear and the third ring gear.

The first, second, and third ring gears of the first, second, and third planetary gear sets may be integrally formed and fixed to the inner side of the speed-up mechanism housing. Additionally, the first sun gear may be connected with the second planetary carrier, the second sun gear may be connected with the third planetary carrier, and rotational power inputted from the one-way power transmission mechanism via the first planetary carrier may be increased and transmitted to the rotary shaft of the generator via the third sun gear. The energy regeneration device of a suspension system for a vehicle may further include a power source (e.g., a battery) electrically connected with the rectifier and accumulating electric energy.

DESCRIPTION OF SYMBOLS

Figure 1:
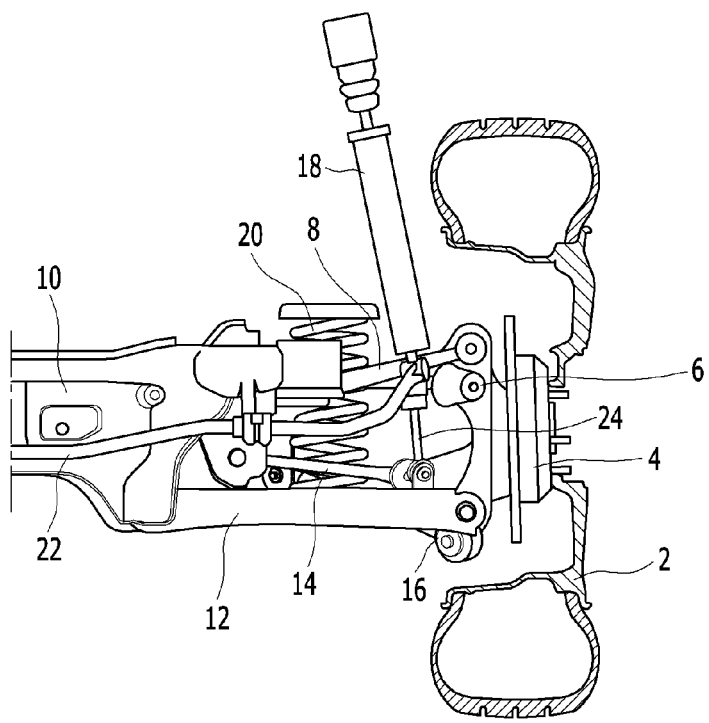
FIG. 1 is an exemplary schematic diagram of a common suspension system according to the related art.

30: Suspension link
31: Vehicle body connection portion
40: Bush unit
41: Output gear
42: Outer pipe
43: Inner pipe
44: Bush rubber
45: Bearing support ring
46: First bearing
47: Second bearing
48: Rotation fixing mechanism
49: Connection link
50: One-way power transmission mechanism
51: Input gear
52: Inner case
53: Outer case
54: Third bearing
55: Fourth bearing
56: One-way clutch
57: Speed-up gear
58: Idle gear
59: Idle gear
60: Generator
70: Speed-up mechanism
71: Speed-up mechanism housing
80: Rectifier
90: Power Source
100: Vehicle body

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described hereafter in detail with reference to the accompanying drawings. Further, the sizes and thicknesses of the configurations shown in the drawings are provided selectively fir the convenience of description, such that the present invention is not limited to those shown in the drawings and the thicknesses are exaggerated to make some parts and regions clear. The unrelated parts to the description of the exemplary embodiments are not shown to make the description clear and like reference numerals designate like element throughout the specification.

Figure 2:
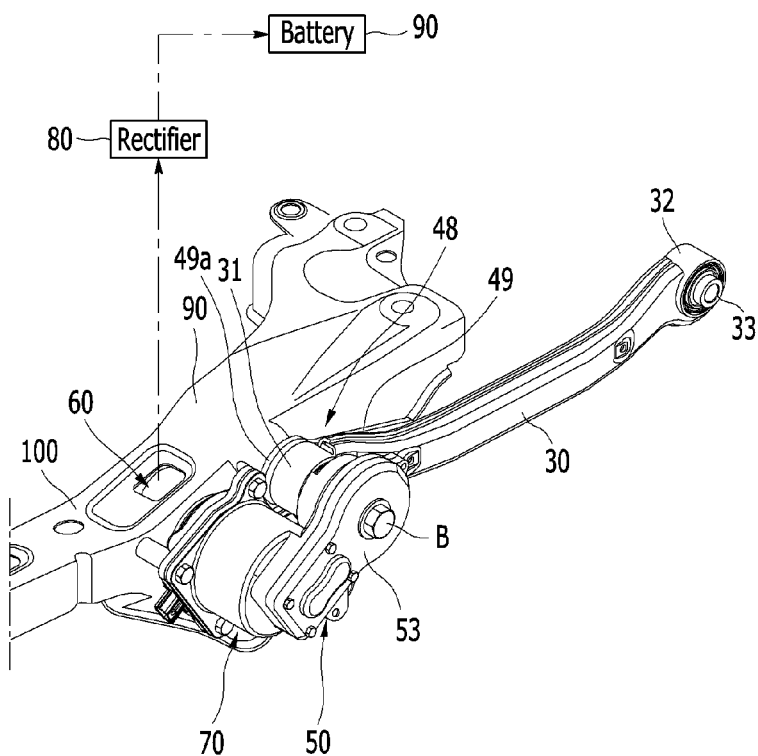
FIG. 2 is an exemplary view showing an energy regeneration device according to an exemplary embodiment of the present invention.
Figure 3:
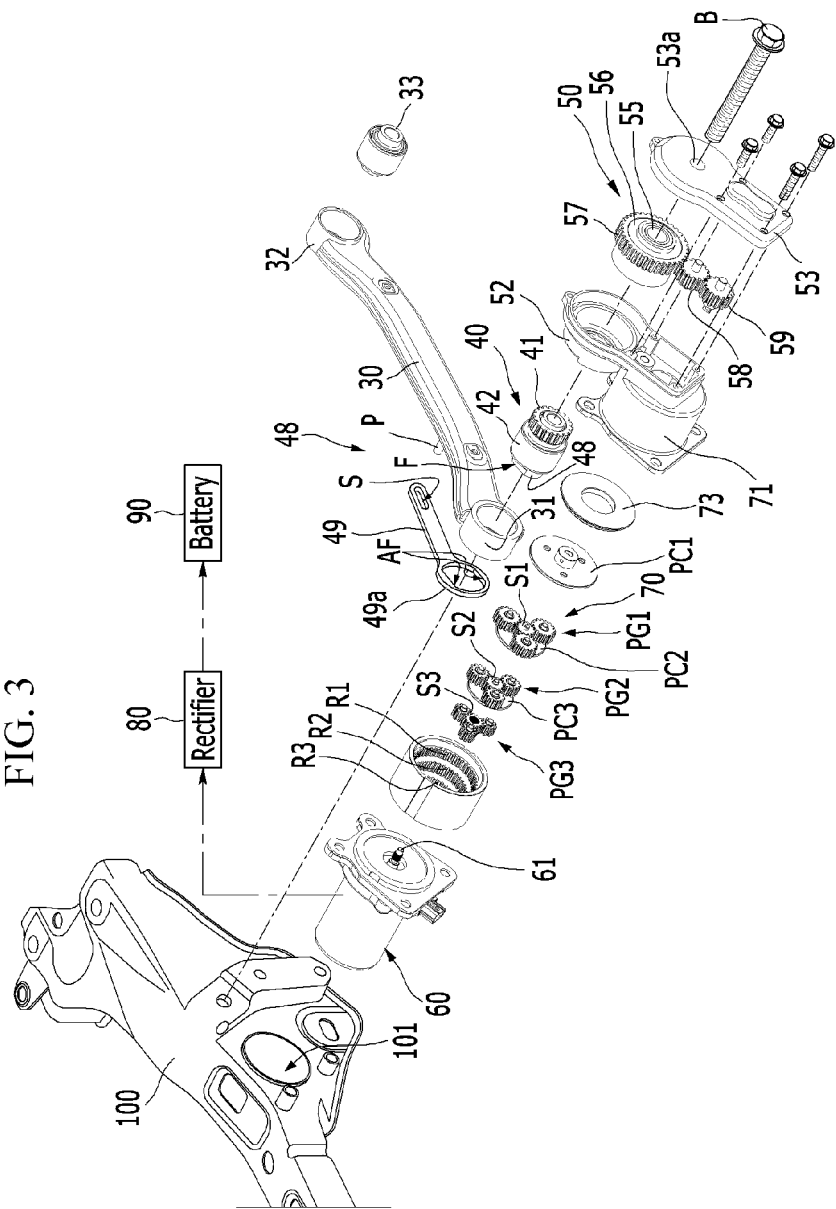
FIG. 3 is an exemplary exploded view showing the energy regeneration device according to an exemplary embodiment of the present invention.
Figure 4:
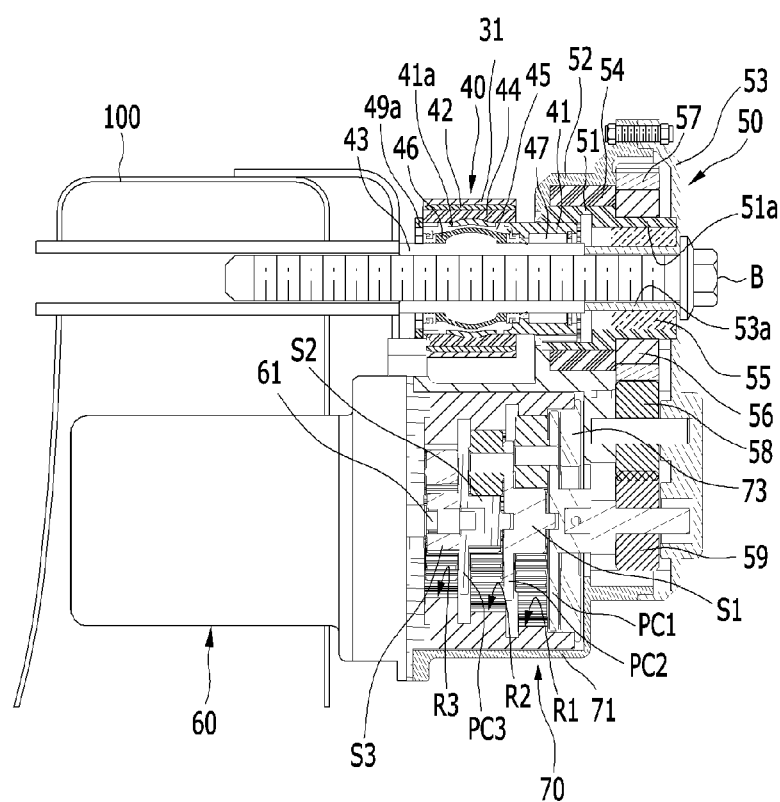
FIG. 4 is an exemplary cross-sectional view showing an energy regeneration device according to an exemplary embodiment of the present invention.
Figure 5:
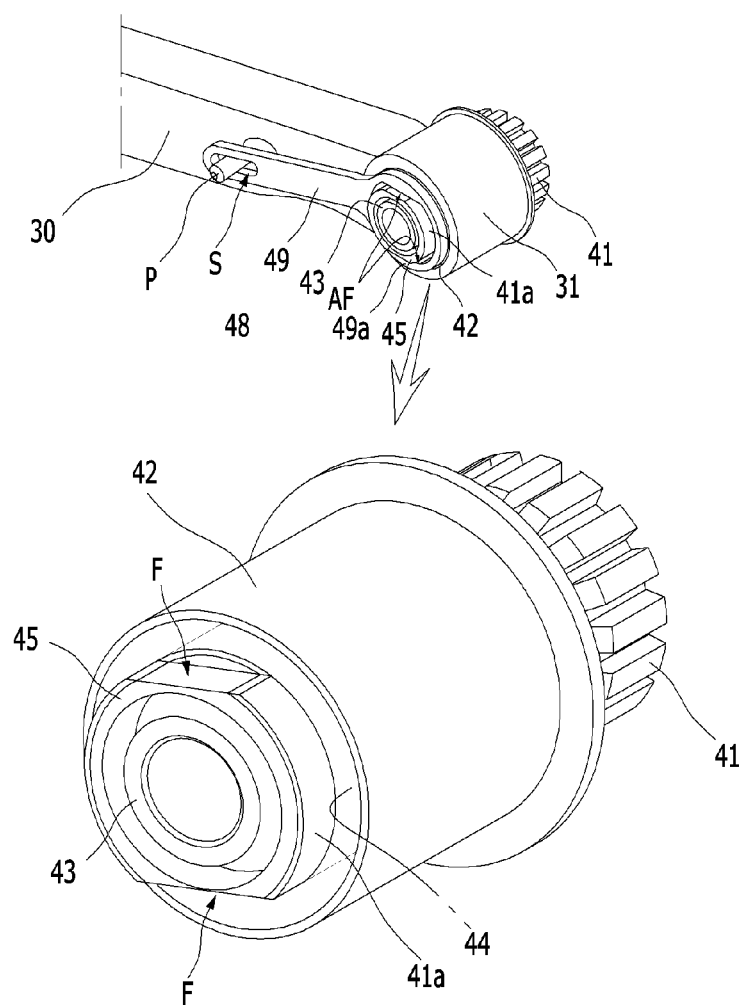
FIG. 5 is an exemplary view showing a rotation fixing mechanism used in an energy regeneration device according to an exemplary embodiment of the present invention.

FIG. 2 is an exemplary view showing an energy regeneration device according to an exemplary embodiment of the present invention, FIG. 3 is an exemplary exploded view showing the energy regeneration device according to an exemplary embodiment of the present invention, FIG. 4 is an exemplary cross-sectional view showing an energy regeneration device according to an exemplary embodiment of the present invention, and FIG. 5 is an exemplary view showing a rotation fixing mechanism used in an energy regeneration device according to an exemplary embodiment of the present invention.

Referring to FIGS. 2 and 4, an energy regeneration device according to an exemplary embodiment of the present invention may include a suspension link 30, a bush unit 40, a one-way power transmission mechanism (e.g., power transmission mechanism 50), a generator 60, a speed-up mechanism 70, a rectifier 80, and a power source (e.g., a battery) 90. The suspension link 30 may include all the links that connect a wheel carrier (see FIG. 1) to a vehicle body 100 (e.g., rear wheel member) and continuously bump and rebound, depending on the condition of a road.

The energy regeneration device according to an exemplary embodiment of the present invention may be applied to a rear wheel strut type of suspension, as an example, hut is not limited thereto. In other words, the suspension link 30 may be applied to all types of links that connect a wheel carrier to a vehicle body to make a link operation, in all types of suspensions, including a multilink type, a dual link type, and a (double) wishbone type, and may be applied to the front wheels too.

The bush unit 40 may be disposed between the vehicle body connection portion 31 of the suspension link 30 and the vehicle body 100 and may be configured to output two-way rotational power of the vehicle body connection portion 31 due to rotation (e.g., pivot) of the suspension link 30 via an output gear 41. The output gear 41 may be connected to a side of the suspension link 30 by the rotation fixing mechanism 48 and may be configured to rotate integrally with the vehicle body connection portion 31 of the suspension link 30.

The one-way power transmission mechanism 50 may be connected with the output gear 41 of the bush unit 40, may be configured to receive the two-way rotation transmitted from the output gear 41 via an input gear 51, and transmit one-way rotational power to the speed-up mechanism 70. In addition, the generator 60 may be configured to generate electric energy while being rotated by the one-way rotational power transmitted from the speed-up mechanism 70. The speed-up mechanism 70 may be configured to increase the one-way rotational power transmitted from the one-way power transmission mechanism 50 and transmit the increased power to a rotary shaft 61 of the generator 60. Further, the rectifier 80 may be electrically connected with the generator 60 and may be configured to rectify the electricity generated by the generator 60 and the battery 90 may be electrically connected with the rectifier 80 and may be configured to accumulate electric energy.

The configuration of the energy regeneration device is described in more detail herein below. The suspension link 30, a link member that has a predetermined length, has a wheel connection portion 32 and the vehicle body connection portion 31 formed at both ends, respectively, the wheel connection portion 32 may be connected with a wheel carrier (4 in FIG. 1) by a rubber bush 33, and the vehicle body connection portion 31 may be fastened to a vehicle body 100 through the bush unit 40 by a bolt B. Therefore, as the wheel connection portion 32 revolves (e.g., pivots) around the vehicle body connection portion 31, depending on the condition of a road, the vehicle body connection portion 31 may be configured to generate rotational power in a first direction (e.g., forward) and in a second direction (e.g., backward) via the bush unit 40.

The bush unit 40 may include, as shown in FIG. 4, an outer pipe 42, an inner pipe 43, a bush rubber 44, an output gear 41, a bearing support ring 45, and a first bearing 46. The outer pipe 42 may be fined and fixed within the vehicle body connection portion 31 of the suspension link 30 and the inner pipe 43 may be disposed inside the outer pipe 42 and fastened to the vehicle body 100 by the bolt B. The bush rubber 44 may be disposed between the outer pipe 42 and the inner pipe 43 and may be bonded to the inner side of the outer pipe 42. The outer gear 41 may have an inner extension 41a that extends between the rubber bush 44 and the inner pipe 43 and may be connected to the bush rubber 44 by the inner extension 41a.

The bearing support ring 45 may be fixed to the inner side of the inner extension 41a of the output gear 41. The first bearing 46 may be a plastic friction bearing and disposed on the outer side of the inner pipe 43. The first bearing 46 and the bearing support ring 45 may be injection-molded plastic products and may be in contact with a reduced the friction coefficient. A second bearing 47 may be disposed between the inner side of the output gear 41 and the outer side of the inner pipe 43, in which the second bearing 47 may be a needle bearing.

As shown in FIG. 5, the output gear 41 of the bush unit 40 may be rotated integrally with the vehicle body connection portion 31 of the suspension link 30 via the rotation fixing mechanism 48. The rotation fixing mechanism 48 may include a connection link 49 and fixing pin P. A coupling portion may be formed at the inner extension 41a of the output gear 41 and a circular socket ring 49a may be formed at the connection link 49. The coupling portion may have straight portions F that rotate integrally with the socket ring 49a and straight support ends AF may be formed at the socket ring 49a to support the straight portions F. The fixing pin P may be disposed at a side of the suspension link 30, a slot S may be formed at the connection link 49, and the fixing pin P may be inserted into the slot S. The rotation fixing mechanism 48 allows the output gear 41 of the bush unit 40 to rotate integrally in a rotation direction by rotation of the suspension link 30 and to absorb relative displacement to the fixing pin P and the slot S in a torsion direction.

Furthermore, the one-way power transmission mechanism 50 may include an inner case 52 and an outer case 53. The inner case 52 may be disposed at the bush unit 40 and the outer case 53 may be combined with the inner case 52. A bolt insertion pipe 53a that extends axially inward through which the bolt B may be inserted may be formed at the substantial center of the outer case 53. In addition, the one-way power transmission mechanism 50 may include an input gear 51, a third bearing 54, a fourth bearing 55, a one-way clutch 56, a speed-up gear 57, and one or more idle gears 58 and 59, which may be disposed inside the inner case 52 and the outer case 53.

The input gear 51 may be in mesh with (e.g., may correspond to) the output gear 41 and may have an outer extension 51a that extends axially outward. The third bearing 54 may be disposed between the outer side of the input gear 51 and the inner side of the inner case 52 and the fourth bearing 55 may be disposed between the inner side of the outer extension 51a and the outer side of the bolt insertion pipe 53a. The one-way clutch 56 may be disposed on the outer side of the outer extension 51a of the input gear 51 and the speed-up gear 57 may be disposed on the outer side of the one-way clutch 56. The speed-up gear 57 may be configured to receive only one-way rotational power from the one-way clutch 56 and rotate only in one direction, that is, only in a forward direction or a backward direction.

Further, as shown in FIG. 3, the two idle gears 58 and 59 may be in mesh with the speed-up gear 57 and may be configured to transmit the one-way rotational power from the speed-up gear 57 to the speed-up mechanism 70. Although two idle gears 58 and 59 are provided in the drawings, the present invention is not limited thereto and a plurality of idle gears may be provided, depending on the space inside the inner case 52 and the outer ease 53 and the number of teeth of the idle gears.

The one-way clutch 56 may be disposed to connect the rotational power of the output gear 41 to the speed-up gear 57, when the suspension link 30 bumps, or alternatively, the one-way clutch may connect the rotational power of the output gear 41 to the speed-up gear 57 only when the suspension link 30 rebounds.

The generator 60 may be inserted in an installation aperture 101 formed at one side of the member sided the vehicle body 100. In addition, the generator 60 may be configured to generate electricity, using the rotational power increased and transmitted from the speed-up mechanism 70. The speed-up mechanism 70 may include one or more planetary gear sets PG1, PG2, and PG3 disposed within a speed-up mechanism housing 71 formed between the generator 60 and the one-way power transmission mechanism 50. Although three planetary gear sets are provided in the drawings, the present invention is not limited thereto and an appropriate number of planetary gear sets that may increase the rotational speed in bumping or rebounding to the optimum speed for the generator 60 to generate electricity may be provided. The configuration composed of three planetary gear sets PG1, PG2, and PG3 is exemplified herein for better comprehension and ease of description.

All the three planetary gear sets PG1, PG2, and PG3 may be single pinion planetary gear sets and may be connected such that ring gears R1, R2, and R3 of the single planetary gear sets PG1, PG2, and PG3, respectively, are fixed to the speed-up mechanism housing 71 to function as fixed elements, planetary carriers PC1, PC2, and PC3 may function as input elements, and sun gears S1, S2, and S3 may function as output element.

The first planetary gear set PG1, single pinion planetary gear set, may include the first sun gear S1, the first ring gear R1, and the first planetary carrier PG1 that supports a first pinion P1 which is in mesh with the first sun gear S1 and the first ring gear R1 therebetween. The second planetary gear set PG2, single pinion planetary gear set, may include the second sun gear S2, the second ring gear R2, and the second planetary carrier PC2 that supports a second pinion P2 which is in mesh with the second sun gear S2 and the second ring gear R2 therebetween. The third planetary gear set PG3, single pinion planetary gear set, may include the third sun gear S3, the third ring gear R3, and the third planetary carrier PC3 that supports a third pinion P3 disposed between the third sun gear S3 and the third ring gear R3.

The first, second, and third ring gears R1, R2, and R3 of the first, second, and third planetary gear sets PG1, PG2, and PG3 may be integrally formed and fixed to the inner side of the speed-up mechanism housing 71. In addition, the first sun gear S1 may be connected with the second planetary carrier PC2 and the second sun gear S2 may be connected with the third planetary carrier PC3. Accordingly, the speed-up mechanism 70 may be configured to increase the rotational power input via the first planetary carrier PC1 from the idle gear 59 of the one-way power transmission mechanism 50 in several steps and transmit the increased rotational power to the rotary shaft 61 of the generator 60 via the third sun gear S3.

Figure 6:
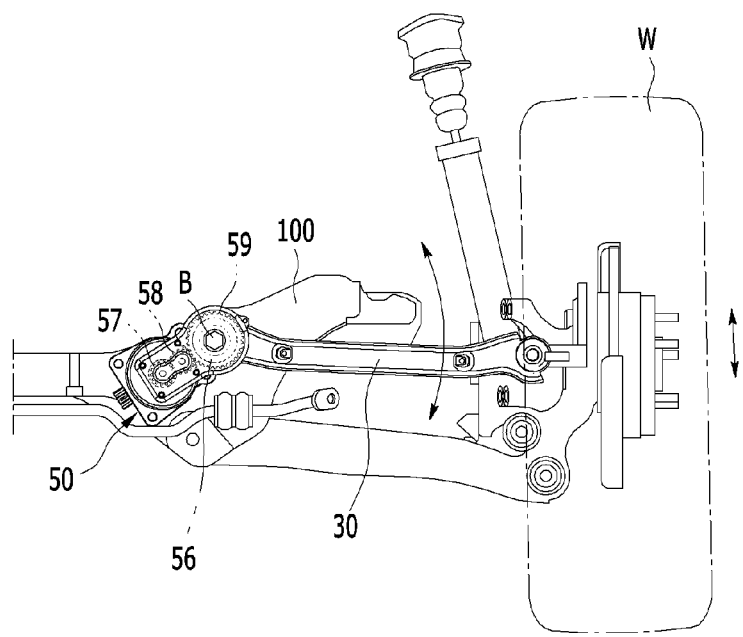
FIG. 6 is an exemplary view illustrating an operation status of the energy regeneration device according to an exemplary embodiment of the present invention.

The first planetary carrier PC1 may be supported on one side by a support disc 73. Therefore, in the energy regeneration device of a suspension system for a vehicle having the configuration described above, as shown in FIG. 6, as the wheel W continuously repeats bumping and rebounding, depending on the condition of the surface of a road, the suspension link 30 may be configured to repeatedly rotate the outer pipe 42 of the bush unit 40 in a first direction (e.g., forward) and a second direction (e.g., backward) inside the vehicle body connection portion 31.

The output gear 41 in the bush unit 40 may be configured to transmit rotational power to the one-way clutch 56 via the input gear 51 while being rotated with the rotation of the suspension link 30 by the connection link 49. In addition, the output gear 41 of the bush unit 40 may be configured to transmit the rotational power, as it is, by the connection link 49 such that torsional force transmitted from the suspension link 30 may be absorbed by the bush rubber 44 with the degree of freedom by the gap between the slot S of the connection link 49 and the fixing pin P.

Depending on the installation direction, the one-way clutch 56 may be configured to transmit only one-way rotational power in bumping to the speed-up gear 57 without transmitting rotational power in rebounding, or alternatively, the one-way clutch 56 may be configured to transmit only the rotational power in rebounding without transmitting the one-way rotational power in bumping to the speed-up gear 57.

The speed-up gear 57 may be configured to increase the one-way rotational power and transmit the increased one-way rotational power to the speed-up mechanism 70 via the idle gears 58 and 59. In addition, the speed-up mechanism 70 may be configured to increase the one-way rotational power input by the operation of one or more planetary gear sets PG1, PG2, and PG3 and transmit the increased one-way rotational power to the generator 60, thereby generating electricity. The electricity generated by the generator 60 may be rectified by the rectifier 80, as described above, and the e battery 90 may be charged. In other words, the kinetic energy from movement of a vehicle may be regenerated into electric energy, thus increasing energy efficiency.

Further, the energy regeneration device operating with the configuration, as described above, may be applied to the vehicle body connection portion of all of suspension links pivoting up and down, depending on the condition of a road regardless of the configuration type of the suspension. In other words, all types of links that connect a wheel carrier with a vehicle body to make a link operation, in all of suspension links, including a multilink type, a Macpherson type, a dual link type, and a (double) wishbone type, and may regenerate energy.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. An energy regeneration device of a vehicle suspension system, the energy regeneration device comprising:
 a suspension link that connects a wheel carrier to a vehicle body;
 a bush unit that is disposed between a vehicle body connection portion of the suspension link and the vehicle body and outputs hinge motion of the suspension link via an output gear having a coupling portion formed at an inner extension;
 a rotation fixing mechanism that rotates the output gear integrally with the vehicle body connection portion of the suspension link by connecting the output gear to a side of the suspension link and provides the degree of freedom with respect to torsion of the suspension link, wherein the rotation fixing mechanism includes a fixing pin that protrudes from the side of the suspension link, and a connection link that has a circular socket ring integrally formed at a first side coupled to the coupling portion, and a slot at a second side;
 a one-way power transmission mechanism that is connected with the output gear of the bush unit, receives the hinge motion transmitted from the output gear via an input gear, and outputs one-way rotational power;
 a generator that is disposed at a side of the vehicle body and generates electricity while being rotated by the transmitted one-way rotational power;
 a speed-up mechanism that is disposed between the generator and the one-way power transmission mechanism and transmits the one-way rotational power transmitted from the one-way power transmission mechanism to the generator; and
 a rectifier that is electrically connected with the generator and rectifies the electricity generated by the generator.

2. The device of claim 1, wherein the bush unit includes:
 an outer pipe combined with the vehicle body connection portion of the suspension link;
 an inner pipe disposed inside the outer pipe and fixed to the side of the vehicle body;
 a bush rubber disposed between the outer pipe and the inner pipe and combined with the outer pipe;
 an output gear connected with the bush rubber via an inner extension that extends between the rubber bush and the inner pipe;
 a bearing support ring fixed to the inner side of the inner extension of the output gear; and
 a first bearing disposed on the outer side of the inner pipe in friction contact with the bearing support ring.

3. The device of claim 1, wherein the coupling portion has straight portions rotating integrally with the socket ring, and the socket ring has support ends that support the straight portions.

4. The device of claim 1, wherein the one-way power transmission mechanism includes:
 an inner case;
 an outer case combined with the inner case and having a bolt insertion pipe into which a bolt is inserted;
 an input gear engaged with the output gear inside the inner case and the outer case and having an outer extension that extends axially outward;
 a one-way clutch disposed on the outer side of the external extension;
 a speed-up gear disposed on the outer side of the one-way clutch; and
 a plurality of idle gears that transmit one-way rotational power to the speed-up mechanism in mesh with the speed-up gear.

5. The device of claim 4, wherein the one-way power transmission mechanism further includes:
 a third bearing disposed between the outer side of the input gear and the inner case; and
 a fourth bearing disposed between the inner side of the outer extension and the outer side of the bolt insertion pipe.

6. The device of claim 1, wherein the speed-up mechanism includes:
 a speed-up mechanism housing integrally formed between the generator and the one-way power transmission mechanism; and
 a plurality of planetary gear sets disposed within the speed-up mechanism housing.

7. The device of claim 1, wherein the plurality of planetary gear sets are single pinion planetary gear sets.

8. The device of claim 6, wherein the plurality of planetary gear sets includes three single pinion planetary gear sets.

9. The device of claim 8, wherein a ringer of each of the single pinion gear sets is fixed to the speed-up mechanism housing and functions as a fixed element, a planetary carrier functions as an input element, and a sun gear functions as an output element.

10. The device of claim 8, wherein the three planetary gear sets include:
 a first planetary gear set that is a single pinion planetary gear set including a first sun gear, a first ring gear, and a first planetary carrier that supports a first pinion in mesh with the first sun gear and the first ring gear therebetween;
 a second planetary gear set that is a single pinion planetary gear set including a second sun gear, a second ring gear, and a second planetary carrier that supports a second pinion in mesh with the second sun gear and the second ring gear therebetween; and
 a third planetary gear set that is a single pinion planetary gear set including a third sun gear, a third ring gear, and a third planetary carrier that supports a third pinion disposed between the third sun gear and the third ring gear.

11. The device of claim 10, wherein the first, second, and third ring gears of the first, second, and third planetary gear sets are integrally formed and fixed to the inner side of the speed-up mechanism housing, the first sun gear is connected with the second planetary carrier, the second sun gear is connected with the third planetary carrier, and rotational power input from the one-way power transmission mechanism via the first planetary carrier is increased and transmitted to the rotary shaft of the generator via the third sun gear.

12. The device of claim 1, further comprising:
 a battery electrically connected with the rectifier and accumulates electric energy.

13. An energy regeneration device of a suspension system a vehicle, the energy regeneration device comprising:
 a rotation fixing mechanism that rotates the output gear integrally with a vehicle body connection portion of a suspension link by connecting the output gear to a side of the suspension link and provides the degree of freedom with respect to torsion of the suspension link, wherein the rotation fixing mechanism includes a fixing pin that protrudes from the side of the suspension link, and a connection link that has a circular socket ring integrally formed at a first side coupled to the coupling portion, and a slot at a second side;
 a one-way power transmission mechanism that is connected with the output gear of a bush unit, receives the hinge motion transmitted from an output gear via an input gear, and outputs one-way rotational power; and a speed-up mechanism that is disposed between a generator and the one-way power transmission mechanism and transmits the one-way rotational power transmitted from the one-way power transmission mechanism to the generator.

14. The device of claim 13, wherein the bush unit is disposed between the vehicle body connection portion of the suspension link and a vehicle body and outputs hinge motion of the suspension link via the output gear.

15. The device of claim 13, further comprising:

a generator disposed at a side of the vehicle body and generates electricity while being rotated by the transmitted one-way rotational power; and a rectifier electrically connected with the generator and rectifies the electricity generated by the generator.

* * * * *